United States Patent
Lee et al.

(10) Patent No.: US 9,628,671 B2
(45) Date of Patent: Apr. 18, 2017

(54) FRONT-END INTEGRATED CIRCUIT, BROADCAST RECEIVING SYSTEM AND OPERATING METHOD

(71) Applicants: Ki Ho Lee, Suwon-si (KR); Hyung Woan Koo, Hwaseong-si (KR); Sang Ho Kim, Suwon-si (KR); Ho Jin Park, Suwon-si (KR)

(72) Inventors: Ki Ho Lee, Suwon-si (KR); Hyung Woan Koo, Hwaseong-si (KR); Sang Ho Kim, Suwon-si (KR); Ho Jin Park, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 115 days.

(21) Appl. No.: 13/713,051

(22) Filed: Dec. 13, 2012

(65) Prior Publication Data

US 2013/0169870 A1 Jul. 4, 2013

(30) Foreign Application Priority Data

Dec. 30, 2011 (KR) .................... 10-2011-0147689

(51) Int. Cl.
| | | |
|---|---|---|
| H03L 7/00 | (2006.01) |
| H04N 5/06 | (2006.01) |
| H04N 5/44 | (2011.01) |
| H04N 5/46 | (2006.01) |
| H04N 21/43 | (2011.01) |

(52) U.S. Cl.
CPC ............. H04N 5/06 (2013.01); H04N 5/4401 (2013.01); H04N 5/46 (2013.01); H04N 21/4305 (2013.01)

(58) Field of Classification Search
CPC .... H04N 21/42607; H04N 5/455; H04N 5/50; H04N 5/60; H04N 5/14; H04N 21/439

USPC ........ 348/536, 726, 731, 729, 735, 537, 544
See application file for complete search history.

(56) References Cited

U.S. PATENT DOCUMENTS

| 7,683,972 B2* | 3/2010 | Tanigawa ............... G09G 5/008 |
| | | 348/497 |
| 2012/0013807 A1* | 1/2012 | Arora ..................... H04N 5/268 |
| | | 348/705 |
| 2013/0039444 A1* | 2/2013 | Porret .................... H04B 1/006 |
| | | 375/316 |

FOREIGN PATENT DOCUMENTS

| CN | 1258991 A | 7/2000 |
| CN | 101083523 A | 12/2007 |
| JP | 2010500830 A | 1/2010 |
| WO | WO2005084037 A2 | 9/2005 |

OTHER PUBLICATIONS

Japanese Office Action Corresponding to Japanese Application No. 2012-288793 Issued Nov. 8, 2016.

(Continued)

*Primary Examiner* — Brian Yenke
*Assistant Examiner* — Omer Khalid
(74) *Attorney, Agent, or Firm* — Volentine & Whitt, PLLC

(57) ABSTRACT

The front-end integrated circuit includes a first clock unit receiving a reference clock signal from an oscillator and generating a first clock signal, a first analog front end module receiving and processing a first broadcast signal using the first clock signal, a second clock unit receiving the reference clock signal and generating a second clock signal, and a second analog front end module receiving and processing a second broadcast signal using the second clock signal.

20 Claims, 7 Drawing Sheets

(56) References Cited

OTHER PUBLICATIONS

Chinese Office Action Corresponding to Chinese Application No. 2016112902064270 Issued Dec. 2, 2016.

* cited by examiner

FRONT-END INTEGRATED CIRCUIT, BROADCAST RECEIVING SYSTEM AND OPERATING METHOD

CROSS-REFERENCE TO RELATED APPLICATIONS

This application claims priority under 35 U.S.C. §119(a) from Korean Patent Application No. 10-2011-0147689 filed on Dec. 30, 2011, the subject matter of which is hereby incorporated by reference.

BACKGROUND

Embodiments of the inventive concept relate to broadcast systems, and more particularly, to digital television (DTV) systems, analog front-end integrated circuits for DTV systems, and operating methods for analog front-end integrated circuits.

With improvements in communication technologies, increased demand for diversity in entertainment, and rising consumer expectations for high quality media content, a number of different broadcasting services are available. Examples of contemporary broadcasting services include those defined by technical standards promulgated by the terrestrial national television system committee (NTSC) broadcasting service, the terrestrial phase alternating line (PAL) broadcasting service, as well as cable and satellite broadcasting services. Since this proliferation of broadcasting services uses different signal processing techniques, different transmission media, and/or different transmission bands, contemporary broadcast receiving devices must be able to receive and process various signals according to the particular specifications mandated by different broadcasting services.

The circuitry in a broadcast receiving device adapted to receive and initially process an input signal is commonly referred to as a "front-end" circuit. Contemporary broadcast receiving devices must generally include a plurality of front-end circuits, each being respectively capable of receiving and processing a different type of broadcast signal. Each front-end circuit operates in response to one or more clock signals (hereafter, collectively and/or singularly the "clock signal").

Unfortunately, the multiplicity of front-end circuits used in conventional broadcast receiving units each requires its own circuit providing a clock signal. This requirement expands the size of the front-end circuit of the constituent broadcast receiving device and increases manufacturing costs.

SUMMARY

Certain embodiments of the inventive concept provide a front-end integrated circuit having overall reduced chip size and reduced manufacturing costs by using a clock source device shared between a plurality of front-end module in a digital television (DTV) system.

In one embodiment, the inventive concept provides a front-end integrated circuit of a broadcast receiving system, the front-end integrated circuit comprising; a first clock unit configured to receive a reference clock signal from an oscillator and generate a first clock signal, a first analog front end module configured to receive and process a first broadcast signal having a first format using the first clock signal, a second clock unit configured to receive the reference clock signal from the oscillator and generate a second clock signal, and a second analog front end module configured to receive and process a second broadcast signal having a second format different from the first format using the second clock signal.

In another embodiment, the inventive concept provides a digital television (DTV) receiver capable of receiving and processing a composite video banking sync (CVBS) signal as a first broadcast input signal, and at least one of a sound intermediate frequency (SIF), a CH signal, and an intermediate frequency (IF) (SIF/CH/IF) signal as a second broadcast input signal, the DTV receiver comprises a front-end integrated circuit, the front-end integrated circuit comprising; an oscillator that generates a reference clock signal, a first clock unit that generates a first clock signal from the reference clock signal, and a second clock unit that generates a second clock signal from the reference clock signal, a CVBS module that receives and processes the first broadcast input signal using the first clock signal, and a SIF/CH/IF module that receives and processes the second broadcast input signal using the second clock signal.

In another embodiment, the inventive concept provides an operating method for a front-end integrated circuit in a broadcast receiving system, the method comprising; generating a first clock signal and a second clock signal having different frequencies using a reference clock signal generated by a single oscillator, receiving and converting a first analog broadcast signal having a first format into a corresponding first digital signal using the first clock signal, and receiving and converting a second analog broadcast signal having a second format different from the first format into a corresponding second digital signal using the second clock signal.

BRIEF DESCRIPTION OF THE DRAWINGS

The above and other features and advantages of the inventive concept will become more apparent upon consideration of certain exemplary embodiments described with reference to the attached drawings in which.

DETAILED DESCRIPTION

The inventive concept now will be described more fully with reference to the accompanying drawings in which certain embodiments of the invention are illustrated. The invention may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the written description and drawings, like reference numbers and labels are used to denote like or similar elements and features.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
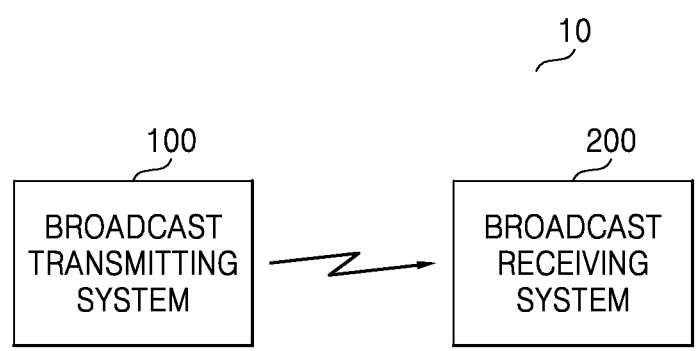
FIG. 1 is a general block diagram illustrating a broadcast system according to certain embodiments of the inventive concept.

FIG. 1 is a general block diagram of a broadcast system 10 according to certain embodiments of the inventive concept comprising a broadcast transmitting system 100 and a broadcast receiving system 200. The broadcast transmitting system 100 may be one of a plurality of broadcast transmitting systems, each capable of transmitting a signal compatible with the broadcast receiving system 200 (i.e., a signal capable of being received and at least initially processed by the broadcast receiving system 200).

Figure 2:
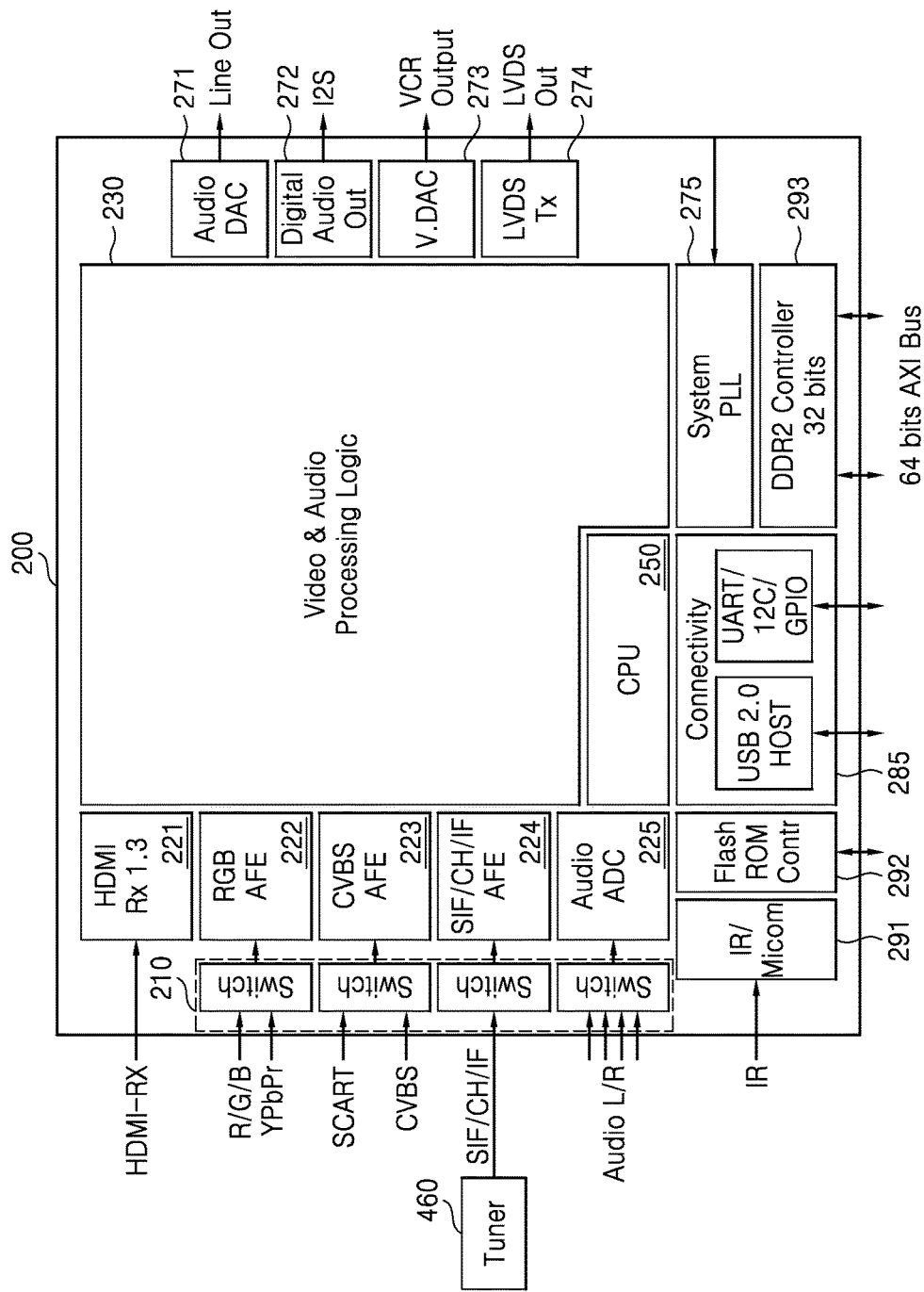
FIG. 2 is a block diagram further illustrating the broadcast receiving system of FIG. 1.

FIG. 2 is a block diagram further illustrating the broadcast receiving system 200 of FIG. 1.

The broadcast receiving system 200 illustrated in FIG. 2 may be a DTV receiver capable of receiving and processing a number of different signals transmitted by a number of different broadcast transmitting systems, each potentially operating in accordance with one or more technical standards. The exemplary broadcast receiving system of FIG. 2 comprises; a switch module 210, a high-definition multimedia interface (HDMI) receiver module 1 221, a red/green/blue (RGB) analog front end (AFE) module 222, a composite video banking sync (CVBS) AFE module 223, a sound intermediate frequency (SIF)/CH/intermediate frequency (IF) AFE module 224, an audio analog-to-digital converter (ADC) module 225, video and audio processing logic 230, a central processing unit (CPU) 250, an audio digital-to-analog converter (DAC) module 271, a digital audio output module 272, a video DAC module 273, a low voltage differential signaling (LVDS) output module 274, and a system phase-locked loop (PLL) 275. In this context, the term "module" broadly refers to one or more circuits operatively arranged or configured to receive and process a compatible signal, and/or output a particular signal.

The broadcast receiving system 200 may also include a micom module 291, a flash read-only memory (ROM) controller 292, an external device interface module 285, and a DDR2 controller 293 facilitating the connection of certain external memories or devices.

The switch module 210 switches an externally provided "input broadcast signal" received by the broadcast receiving system 200 to a particular front-end module corresponding to the input signal.

Thus, in the working example of FIG. 2 the HDMI receiver 221 receives and processes HDMI signals. The RGB AFE 222 receives and processes RGB signals or YPbPr signals. The CVBS AFE 223 receives and processes CVBS signals or SCART signals in a video communication mode using a 21-pin connector. The SIF/CH/IF AFE 224 receives and processes SIF/CH/IF signals, wherein the SIF signal is an audio signal, the CH signal is a digital television (DTV) video signal, and the IF signal is an analog video signal. These exemplary signals are said to have different "formats" that are defined by applicable technical standards according to one or more broadcasting systems.

The audio ADC module 225 receives an analog audio signal and converts it into a digital audio signal. The video and audio processing logic 230 is a module that processes video and audio signals received from the HDMI receiver 221, the RGB AFE 222, the CVBS AFE 223, and the SIF/CH/IF AFE 224. Although illustrated in circuit level particularity, the video and audio processing logic 230 may include a video signal processing module that processes (e.g., demodulates or decodes) a video signal and an audio signal processing module that processes an audio signal.

The video and audio processing logic 230 may be used to process audio signals received from the signal receivers 221 through 224 and the audio ADC module 225. The video and audio processing logic 230 may also be used to demodulate or decode video signals received from the signal receivers 221 through 224.

The CPU 250 controls the overall operation of the broadcast receiving system 200.

The audio DAC module 271 may be used to convert a digital audio signal into an analog audio signal. The digital audio output module 272 may be used to output a digital audio signal.

The video DAC module 273 may be used to convert a digital video signal into an analog video signal. The output of the video DAC module 273 may be a videocassette recorder (VCR) output signal. The LVDS output module 274 is a module that outputs an LVDS signal.

The system PLL 275 is a clock generation module capable of providing a clock signal necessary for the internal operation of the broadcast receiving system 200. The system PLL 275 may be provided with a source clock from an external clock source (e.g., an oscillator), and may be used to generate an internal clock signal and provide the internal clock signal to an internal module such as the CPU 250.

Although the modules illustrated in FIG. 2 are primarily identified according to function, those skilled in the art will recognize that the modules may be variously implemented as separate and/or combined hardware and software. Within certain embodiments of the inventive concept, a plurality of front-end modules for a broadcast receiving system, like those described in relation to FIG. 2, may be integrated within a single integrated circuit (IC). Alternately, the plurality of front-end modules for a broadcast receiving system, like those described in relation to FIG. 2, may be integrated within a chip set including 2 or more integrated circuits. In this regard, the term "integrated circuit" (or "IC") means a unitary semiconductor device encompassed within common packaging. The term integrated circuits subsumes System-on-Chip (SoC) implementations.

As noted above, the broadcast receiving system 200 illustrated in FIG. 2 may be a DTV system, such as a satellite DTV system, a cable DTV system, a handheld DTV system, or a terrestrial DTV system. In one specific embodiment, the broadcast system 10 of FIG. 1 is a high-definition television (HDTV) system.

The handheld DTV system may be implemented within a cellular phone, a smart phone, a table personal computer (PC), an automotive navigation system, a personal digital assistant (PDA), or a portable multimedia player (PMP).

A method of receiving and processing the input broadcast signal will be described with reference to FIG. 2.

Different broadcast signals (i.e., an HDMI signal, an RGB signal or a YPbPr signal, a CVBS signal, and a SIF/CH/IF signal) may be input and received by the respective receivers 221 through 224. Each of a number of different broadcast input signals processed by a corresponding one of the receivers 221 through 224 may be demodulated and decoded under the control of the video and audio processing logic 230 and in accordance with a defined format (and corresponding technical specifications).

The video and audio processing logic 230 may include functional blocks for demodulating or decoding the various types of video and audio signals. For instance, the video and audio processing logic 230 may include a demodulator (not shown), a multifunctional decoder (not shown), and an analog demodulator (not shown).

However, the inventive concept is not restricted to only the illustrated embodiment of FIG. 2. Rather, functional block may be added or eliminated depending on the type of broadcast input signal(s) to be received by the broadcast receiving system 200.

In one embodiment, the video and audio processing logic 230 may include functional blocks capable of scaling various video signals, encoding the video signals, and/or processing the video signals to improve quality. Although not shown, for instance, the video and audio processing logic 230 may include a scaler that changes the scale of a video signal, a CVBS encoder, and a video enhancement block.

A signal output from the video and audio processing logic 230 may be provided through a corresponding one of the output modules 271 through 274.

Figure 3:
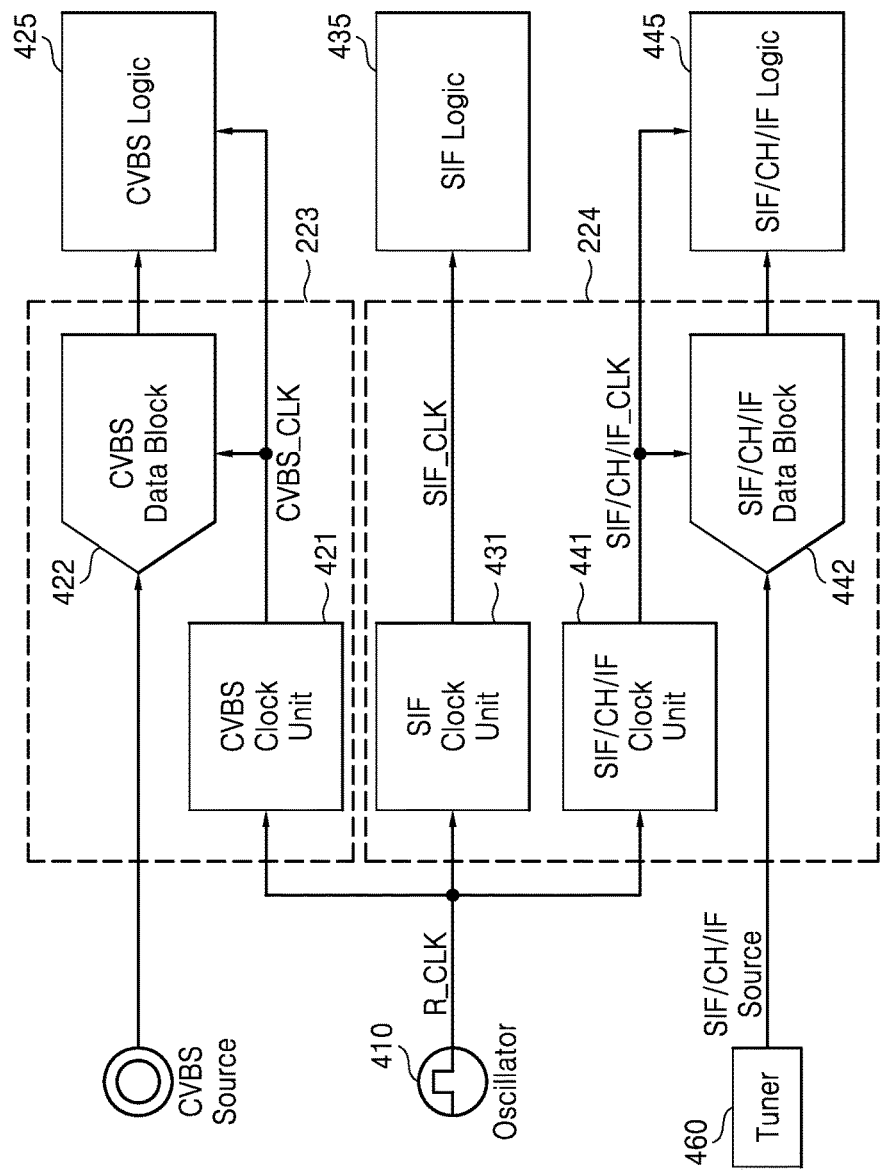
FIG. 3 is a block diagram further illustrating the broadcast receiving system of FIG. 2 in relevant portion according to certain embodiments of the inventive concept.
Figure 4A:
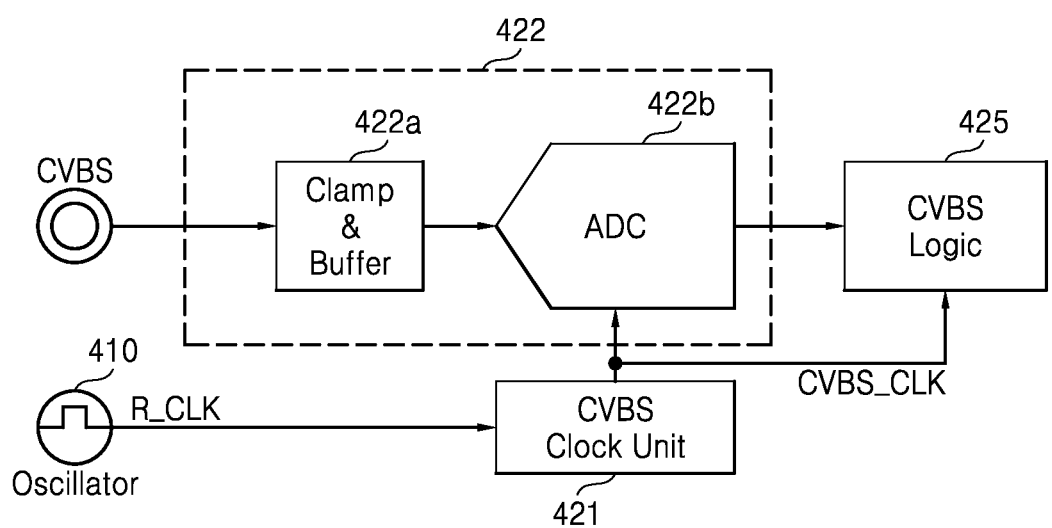
FIG. 4A is a block diagram further illustrating the composite video banking sync (CVBS) analog front end (AFE) of FIG. 3.

FIG. 3 further illustrates relevant portions of a broadcast receiving system according to certain embodiments of the inventive concept. FIG. 4A is a more detailed block diagram of the CVBS AFE 223 illustrated in FIG. 3. Referring to FIGS. 3 and 4A, the CVBS AFE 223 includes a CVBS clock unit 421 and a CVBS data block 422. The CVBS data block 422 may include a buffer 422a and an analog-to-digital converter (ADC) 422b.

The CVBS clock unit 421 receives a reference clock signal R_CLK from an oscillator 410 and generates a CVBS clock signal CVBS_CLK (a "first clock signal"). The CVBS data block 422 receives and converts a CVBS signal into a digital signal using the CVBS clock signal CVBS_CLK. That is, the CVBS signal may be input to the ADC 422b via the buffer 422a, and the ADC 422b may be used to convert the analog CVBS signal into a corresponding digital signal using the CVBS clock signal CVBS_CLK.

Data output from the CVBS data block 422 is input to a CVBS logic 425. The CVBS logic 425 may process, for example, demodulate or decode, the CVBS data using the first clock signal CVBS_CLK. The CVBS logic 425 may be a function block of the video and audio processing logic 230 illustrated in FIG. 2.

Figure 4B:
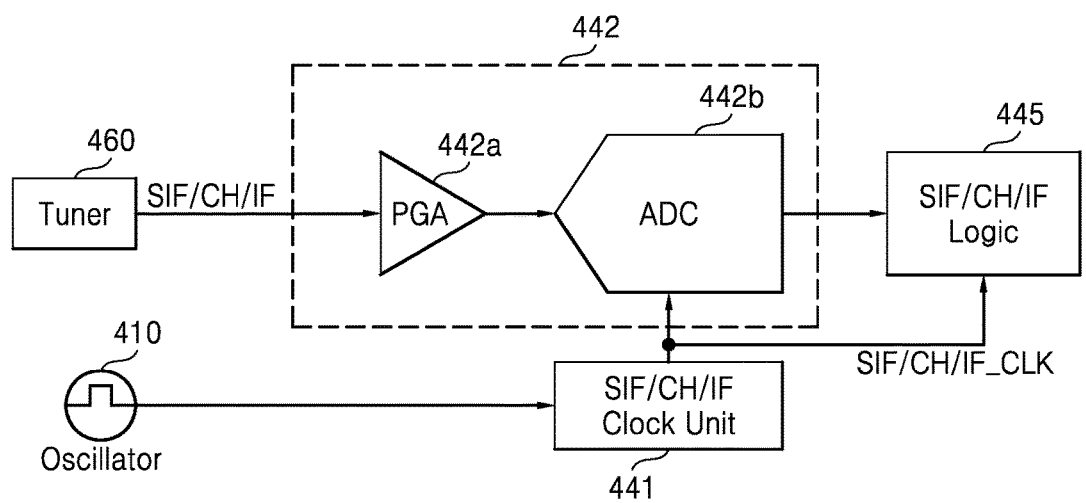
FIG. 4B is a block diagram further illustrating the sound intermediate frequency (SIF)/CH/intermediate frequency (IF) AFE of FIG. 3.

FIG. 4B is a more detailed block diagram of the SIF/CH/IF AFE 224 illustrated in FIG. 3. Referring to FIGS. 3 and 4B, the SIF/CH/IF AFE 224 includes a SIF/CH/IF clock unit 441, a SIF clock unit 431, and a SIF/CH/IF data block 442. The SIF/CH/IF data block 442 may include an amplifier 442a and an ADC 442b.

The SIF/CH/IF clock unit 441 receives the reference clock signal R_CLK from the oscillator 410 and generates a SIF/CH/IF (or "second") clock signal SIF/CH/IF_CLK. Like the SIF/CH/IF clock unit 441, the SIF clock unit 431 receives the reference clock signal R_CLK from the oscillator 410 and generates a SIF (or "third") clock signal SIF_CLK.

The SIF/CH/IF data block 442 may be used to receive and convert a SIF/CH/IF signal into a corresponding digital signal using the SIF/CH/IF clock signal SIF/CH/IF_CLK. The SIF/CH/IF signal may be amplified by the amplifier 442a and then input to the ADC 442b. The amplifier 442a may be a programmable gain amplifier (PGA) having a variable gain factor. The ADC 442b may be used to convert the analog SIF/CH/IF signal into a corresponding digital signal using the SIF/CH/IF clock signal SIF/CH/IF_CLK.

Data output from the SIF/CH/IF data block 442 may be applied to a SIF/CH/IF logic 445. The SIF/CH/IF logic 445 may be used to further process (e.g., demodulate or decode) the SIF/CH/IF data using the SIF/CH/IF clock signal SIF/CH/IF_CLK. A SIF signal in an output signal of the SIF/CH/IF logic 445 may be applied to and further processed by a SIF logic 435. The SIF logic 435 may be used to process the SIF signal as provided by the SIF/CH/IF logic 445 according to the SIF clock signal SIF_CLK generated from the SIF clock unit 431.

The SIF clock signal SIF_CLK may also be used as a system clock signal for the broadcast receiving system 200.

In certain embodiments of the inventive concept it is very likely that first through third clock signals (e.g., CVBS_CLK, SIF/CH/IF_CLK, and SIF_CLK) will have different respective frequencies.

Figure 5A:
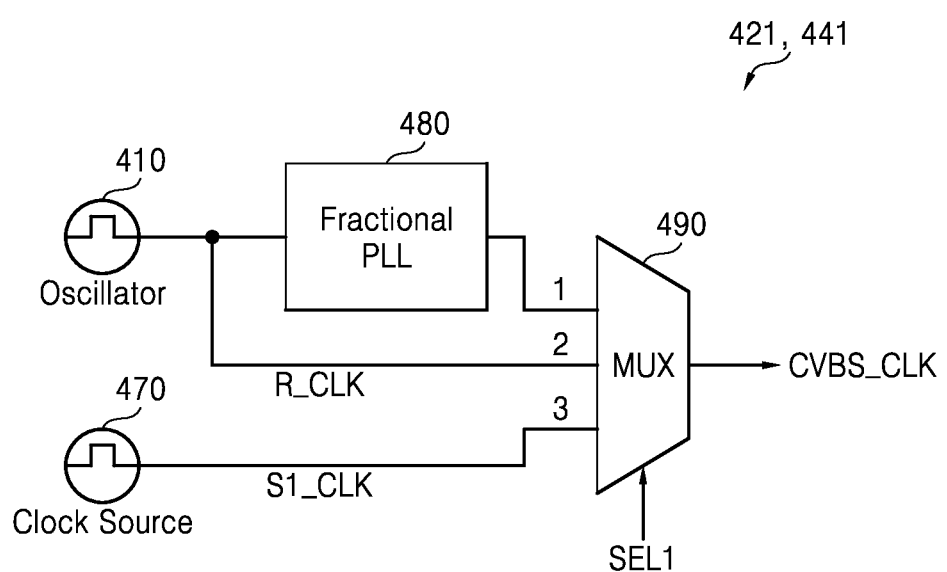
FIG. 5A is a block diagram further illustrating the first clock unit of FIGS. 3 and 4A.

FIG. 5A is a block diagram of the CVBS clock unit 421 illustrated in FIGS. 3 and 4A. The CVBS clock unit 421 includes a PLL 480 and a multiplexer (MUX) 490. The PLL 480 may be a fractional PLL but is not restricted thereto. The PLL 480 may be an integer PLL in other embodiments.

When the PLL 480 is the integer PLL, the PLL 480 may generate a clock signal by multiplying the reference clock signal R_CLK output from the oscillator 410 by an integer.

When the PLL 480 is the fractional PLL, the PLL 480 may generate a clock signal by multiplying or dividing the reference clock signal R_CLK output from the oscillator 410 by an real number.

The MUX 490 may be a 3:1 MUX but is not restricted thereto. The MUX 490 may select a signal from among a PLL output clock signal, the reference clock signal R_CLK, and a source clock signal S1_CLK in response to a select signal SEL1 and output the selected clock signal as the CVBS clock signal CVBS_CLK. The source clock signal S1_CLK may be received from another clock generator (e.g., 275, 431, or 441) within the broadcast receiving system 200 or an external clock source 470 received by broadcast receiving system 200.

The select signal SEL1 may be set in advance according to a system mode or may be generated by the CPU 250. For instance, the select signal SEL1 may be set in advance in a particular register (not shown). When the broadcast receiving system 200 operates in a first mode (e.g., a normal mode), the select signal SEL1 may be set to "1" and the output clock signal of the PLL 480 may be selected as the CVBS clock signal CVBS_CLK. When the broadcast receiving system 200 is in a second mode (e.g., a test mode), the select signal SEL1 may be set to "2" or "3" and either the reference clock signal R_CLK or the source clock signal S1_CLK may be selected as the CVBS clock signal CVBS_CLK.

Figure 5B:
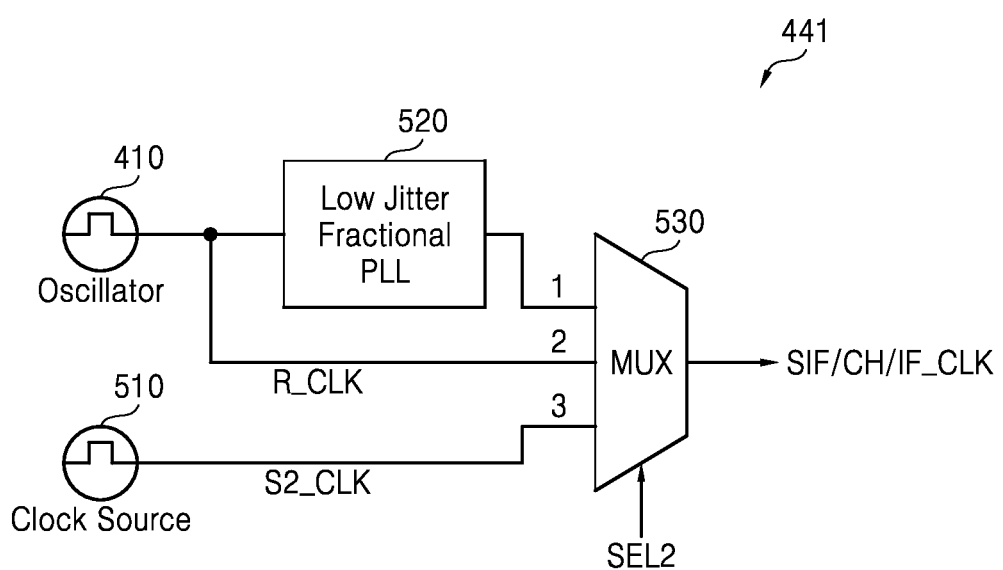
FIG. 5B is a block diagram further illustrating the second clock unit of FIGS. 3 and 4B.

FIG. 5B is a block diagram of the SIF/CH/IF clock unit 441 illustrated in FIGS. 3 and 4B. The SIF/CH/IF clock unit 441 may have a structure similar to that of the CVBS clock unit 421 previously described in relation to FIG. 5A. A PLL 520 may be a low jitter fractional PLL but is not restricted thereto. In other embodiments, the PLL 520 may be an integer PLL.

A MUX 530 may select a signal from among output clock signal of the PLL 520, the reference clock signal R_CLK, and a source clock signal S2_CLK in response to a select signal SEL2 and output the selected clock signal as the SIF/CH/IF clock signal SIF/CH/IF_CLK. The source clock signal S2_CLK may be received from another clock generator (e.g., 275, 421, or 431) within the broadcast receiving system 200 or a clock source 510 external to the broadcast receiving system 200.

The select signal SEL2 may be set in advance according to a system mode or may be generated by the CPU 250. For instance, the select signal SEL2 may be set in advance in a particular register (not shown). When the broadcast receiving system 200 is in the first mode (e.g., the normal mode), the select signal SEL2 may be set to "1" and the output clock signal of the PLL 520 may be selected as the SIF/CH/IF clock signal SIF/CH/IF_CLK. When the broadcast receiving system 200 is in the second mode (e.g., the test mode), the select signal SEL2 may be set to "2" or "3" and the reference clock signal R_CLK or the source clock signal S2_CLK may be selected as the second clock signal SIF/CH/IF_CLK.

Although not separately shown, the SIF clock unit 431 may have a structure similar to that of the clock units 421 and 441 illustrated in FIGS. 5A and 5B. The SIF clock unit 431 may include a de-skew PLL.

The above-described broadcast signals may include digital TV broadcast signals, such as DTV video signals and DTV audio IF signals. The broadcast signals may also include analog TV broadcast signals such as analog video signals and analog audio IF signals.

In certain embodiments of the inventive concept, digital TV broadcast signals, i.e., DTV video signals and DTV audio IF signals may be signals that comply with a European DTV standard, i.e., digital video broadcasting (DVB) family, e.g., DVB satellite (DVB-S), DVB terrestrial (DVB-T), DVB cable (DVB-C), DVB handheld (DVB-H), or DVB satellite services to handhelds (DVB-SH).

In other embodiments of the inventive concept, the digital TV broadcast signals may be signals that comply with a North American DTV standard, i.e., advanced television system committee (ATSC) family, e.g., ATSC terrestrial/cable or ATSC mobile/handheld.

In still other embodiments of the inventive concept, the digital TV broadcast signals may be signals that comply with a Latin American DTV standard, i.e., integrated services digital broadcasting (ISDB), e.g., ISDB satellite (ISDB-S), ISDB terrestrial (ISDB-T), ISDB cable (ISDB-C), or 1seg. Here, 1seg is a mobile terrestrial digital audio IF/video and data broadcasting service in Japan, Chile, Brazil, Peru, and Argentina.

In other embodiments of the inventive concept, the digital TV broadcast signals may be signals that comply with international system for digital broadcast, terrestrial, Brazilian version (ISDB-Tb), i.e., a DTV standard used in Brazil, Argentina, Chile, Peru, Venezuela, Bolivia, Ecuador, Costa Rica, and Uruguay.

In yet other embodiments of the inventive concept, the digital TV broadcast signals may be signals that comply with a Chinese DTV standard, i.e., China digital multimedia broadcast terrestrial/handheld (CDMB-T/H) or China mobile multimedia broadcasting (CMMB).

In still other embodiments of the inventive concept, the digital TV broadcast signals may be signals that comply with a Korean DTV standard, i.e., terrestrial digital multimedia broadcasting (T-DMB) or satellite DMB (S-DMB).

In further embodiments of the inventive concept, the digital TV broadcast signals may be signals that comply with national television system committee (NTSC), phase alternating line (PAL), or sequential color with memory (SECAM).

As described above in relation to certain exemplary embodiments of the inventive concept, clock signals having different frequencies are generated for a plurality of AFEs in a system using a reference clock signal that is provide by a single oscillator. This configuration reduces the size of a front-end IC and lowers overall manufacturing costs.

The inventive concept may also be embodied, in part, as computer readable code stored in computer readable recording medium. The computer readable recording medium is any data storage device capable of storing data that may be thereafter read by a computer or digital logic system. Examples of the computer readable recording medium include ROM, random-access memory (RAM), CD-ROMs, magnetic tapes, floppy disks, and optical data storage devices.

According to embodiments of the inventive concept, a clock source device (e.g., an oscillator) is shared by a plurality of front-end circuits or modules in a DTV system, so that chip size and manufacturing cost may be reduced.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A front-end integrated circuit of a broadcast receiving system, the front-end integrated circuit comprising:
   an oscillator to generate a reference clock signal;
   a first analog front end module to receive and process a first broadcast signal having a first format using a first clock signal, the first broadcast signal transmitted by a first broadcast transmitting system,
   the first analog front end module comprising a first clock unit to receive the reference clock signal from the oscillator and generate the first clock signal; and
   a second analog front end module to receive and process a second broadcast signal having a second format different from the first format using a second clock signal different than the first clock signal, the second analog front end module comprising a second clock unit to receive the reference clock signal from the oscillator and generate the second clock signal, wherein the second broadcast signal is not based on the first broadcast signal but is transmitted by a second broadcast transmitting system different from the first broadcast transmitting system.

2. The front-end integrated circuit of claim 1, further comprising:
a third clock unit to receive the reference clock signal from the oscillator and generate a third clock signal provided to a logic circuit that operates according to the third clock signal.

3. The front-end integrated circuit of claim 2, wherein the third clock unit generates the third clock signal by multiplying or dividing the reference clock signal using an integer.

4. The front-end integrated circuit of claim 2, wherein the first clock signal has a first frequency defined by multiplying or dividing the reference clock signal using a first real number, and
the second clock signal has a second frequency defined by multiplying or dividing the reference clock signal using a second real number and thereafter adjusted in response to one or more jitter characteristics.

5. The front-end integrated circuit of claim 4, wherein the first clock unit comprises:
a fractional-N phase-locked loop (PLL) that receives the reference clock signal and multiplies or divides the reference clock signal using the first real number; and
a first multiplexer that selects and outputs in response to a first selection signal one of the multiplied or divided reference clock signal from the fractional-N PLL, the reference clock signal, and a source clock signal provided by a clock source.

6. The front-end integrated circuit of claim 5, wherein the second clock unit comprises:
a low jitter, fractional-N PLL that receives the reference clock signal and multiplies or divides the reference clock signal using the second real number; and
a second multiplexer that selects and outputs in response to a second selection signal one of the multiplied or divided reference clock signal from the low jitter, fractional-N PLL, the reference clock signal, and the source clock signal.

7. The front-end integrated circuit of claim 6, wherein the third clock unit comprises:
an integer PLL that receives the reference clock signal and multiplies or divides the reference clock signal using an integer; and
a third multiplexer that selects and outputs in response to a third selection signal one of the multiplied or divided reference clock signal from the integer PLL, the reference clock signal, and the source clock signal.

8. The front-end integrated circuit of claim 1, wherein the first broadcast signal is a composite video banking sync (CVBS) signal, and the second broadcast signal is a signal selected from the group consisting of a sound intermediate frequency (SIF) signal, a CH signal, and an intermediate frequency (IF) signal.

9. The front-end integrated circuit of claim 8, wherein the first analog front end module comprises:
a first buffer that receives and buffers the first broadcast signal; and
a first analog-to-digital converter (ADC) that converts the buffered first broadcast signal into a corresponding first digital signal using the first clock signal.

10. The front-end integrated circuit of claim 9, wherein the second analog front end module comprises:
an amplifier having programmably-variable gain that receives and amplifies the second broadcast signal; and
a second ADC that converts the amplified second broadcast signal into a corresponding second digital signal using the second clock signal.

11. A front-end integrated circuit, comprising:
a first clock unit to receive a reference clock signal from an oscillator and to generate a first clock signal;
a first data block to receive a first signal having a first format, the first data block including a buffer and a first analog-to-digital converter to convert the first signal into a first digital signal using the first clock signal, the first signal transmitted by a first broadcast transmitting system;
a second clock unit to receive the reference clock signal from the oscillator and to generate a second clock signal; and
a second data block to receive a second signal having a second format that is different from the first format, the second data block including an amplifier and a second analog-to-digital converter to convert the second signal into a second digital signal using the second clock signal,
wherein the second signal is not based on the first signal but is transmitted by a second broadcast transmitting system different from the first broadcast transmitting system.

12. The front-end integrated circuit of claim 11, wherein the first clock unit includes:
a first phase locked loop (PLL) to receive the reference clock signal and to generate the first clock signal; and
a first multiplexer to receive the reference clock signal, the first clock signal and a first source clock signal, and to select one among the reference clock signal, the first clock signal and the first source clock signal.

13. The front-end integrated circuit of claim 12, wherein the first source clock signal is the second clock signal.

14. The front-end integrated circuit of claim 12, wherein the first source clock signal is a system signal.

15. The front-end integrated circuit of claim 11, wherein the second clock unit includes:
a second phase locked loop (PLL) to receive the reference clock signal and to generate the second clock signal; and
a second multiplexer to receive the reference clock signal, the second clock signal and a second source clock signal, and to select one among the reference clock signal, the second clock signal and the second source clock signal.

16. The front-end integrated circuit of claim 15, wherein the second source clock signal is the first clock signal.

17. The front-end integrated circuit of claim 15, wherein the second source clock signal is a system signal.

18. A system on chip (SoC), comprising:
a memory controller;
a CPU to control an overall operation of the SoC;
a digital to analog converter;
a first clock unit to receive a reference clock signal from an oscillator and to generate a first clock signal;
a first data block to receive a first signal having a first format, the first data block including a buffer and a first analog-to-digital converter to convert the first signal into a first digital signal using the first clock signal, the first signal transmitted by a first broadcast transmitting system;

a second clock unit to receive the reference clock signal from the oscillator and to generate a second clock signal;

a second data block to receive a second signal having a second format that is different from the first format, the second data block including an amplifier and a second analog-to-digital converter to convert the second signal into a second digital signal using the second clock signal, wherein the second signal is not based on the first signal but is transmitted by a second broadcast transmitting system different from the first broadcast transmitting system;

a third clock unit to receive the reference clock signal from the oscillator and to generate a third clock signal;

a first logic to receive the first digital signal and to process the first digital signal using the first clock signal; and a second logic to receive the second digital signal and to process the second digital signal using the second clock signal.

19. The SoC of claim 18, wherein the first clock unit includes a first phase locked loop (PLL) to receive the reference clock signal and to generate the first clock signal, and a first multiplexer to receive the reference clock signal, the first clock signal and a first source clock signal and to select one among the reference clock signal, the first clock signal and the first source clock signal, and the second clock unit includes a second phase locked loop (PLL) to receive the reference clock signal and to generate the second clock signal, and a second multiplexer to receive the reference clock signal, the second clock signal and a second source clock signal, and to select one among the reference clock signal, the second clock signal and the second source clock signal.

20. The SoC of claim 18, wherein the first source clock signal is one among the second clock signal, the third clock signal or a system signal, and the second source clock signal is one among the first clock signal, the third clock signal or the system signal.

\* \* \* \* \*